United States Patent Office 2,885,374
Patented May 5, 1959

2,885,374

AMYLACEOUS COATING COMPOSITION CONTAINING HEXAMETHYLENETETRAMINE, PAPER PRODUCT COATED THEREWITH, AND METHOD OF MAKING SAME

Edward J. Sweeney, Philadelphia, Pa., assignor to Rohm & Haas Company, Philadelphia, Pa., a corporation of Delaware No Drawing. Application December 21, 1955
Serial No. 554,408

19 Claims. (Cl. 260—17.4)

This invention relates to mineral-coating compositions and to paper coated therewith. Mineral-coating compositions, such as are commonly applied to paper body stock in the manufacture of mineral-coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e.g. so that it will not be removed (or show "pick") by the pull of printing ink during the printing operation. Nevertheless, the particular adhesive used does have considerable influence upon the working qualities of the coating composition; e.g., viscosity, flow, spreadability, etc. Likewise, the adhesive used in the coating composition has a definite effect upon the quality and appearance of the finished coated paper made therewith. For example, the plasticity of the adhesive has a pronounced effect on the ability of the supercalender to produce a level and good printing surface.

Starch and starch derivatives have been used heretofore as binders in such paper or paperboard coating compositions. Coated boards carrying amylaceous binders have limited resistance to pick during printing operations. Aqueous dispersions of water-insoluble linear polymers and copolymers, such as those of acrylic esters, styrene, acrylonitrile, butadiene, vinyl acetate and the like, have also been used as binders for pigments and they generally impart much greater resistance to pick during printing operations. However, such aqueous dispersions are considerably more expensive on the basis of binder weight than the amylaceous materials. Hence, it is quite common practice to replace more or less of the linear polymer with an amylaceous material or to use a completely amylaceous binder in order to reduce the cost of the coating composition even at the expense of printability.

In accordance with the present invention, it has been found that coating compositions containing an amylaceous binder material can be improved in respect to their printability by the addition thereto of hexamethylenetetramine. Not only is the resistance of the coating against being pulled up by the printing ink increased when the hexamethylenetetramine is employed in a coating composition having starch or other amylaceous material as the sole binder, but the hexamethylenetetramine also improves such resistance to pick when employed with coating compositions comprising an amylaceous material in conjunction with other binder materials, such as linear addition polymers of the type mentioned hereinabove, casein, soya bean protein, α-protein, zein, or the like. The improvement apparently is specific to any amylaceous coating composition.

The amount of total binder in such coating compositions is from 8% to 25% by weight of the pigment and is preferably 12% to 20% by weight thereof. The binder may consist entirely of an amylaceous material, by which term it is meant to include starch itself, degraded or oxidized starches, chlorinated starches, hydrolyzed starches, starch acetate, and starch ethers such as hydroxyethyl derivatives of starch in which the starch is combined with 1% to 5% on its weight of ethylene oxide. In addition to the starch, the binder may comprise a water-insoluble linear polymer of the type mentioned hereinabove. Examples thereof include homopolymers and copolymers of the esters of alcohols having from 1 to 12 carbon atoms with acrylic acid, methacrylic acid, or itaconic acid; copolymers of acrylonitrile or methacrylonitrile with vinyl acetate, vinyl chloride, a vinyl pyridine or any of the acrylic, methacrylic or itaconic acid esters mentioned above; preferably, the polymers or copolymers have a $T_1$ value (as defined hereinafter) of $-45°$ C. to $20°$ C. The $T_1$ value of the acrylate esters is within the range specified, and they may be copolymerized with lower alkyl methacrylates, in which the alkyl group has 1 to 4 carbon atoms, styrene, acrylonitrile, methacrylonitrile, vinyl acetate, vinyl chloride, vinylidene chloride, provided the amount of the latter comonomer or comonomers is not so large as to cause the copolymer obtained to exceed the upper limit of $20°$ C. for the $T_1$ value. The linear copolymers may also comprise from 1% to 5% of hydrophilic groups, such as amide groups, carboxyl groups, hydroxyl groups, or amino groups, in all cases the amount being below the proportion that would render the copolymer water-soluble. Besides linear copolymers, a portion of the binder material may be composed of casein, soya protein, α-protein, zein, or the like. Preferably, from the cost standpoint, the starch forms from 50% to 100% by weight of the binder and the other binder materials may amount to from 0% to 50%. In binders which comprise a mixture of the amylaceous material with a water-insoluble linear polymer, a preferred proportion of the linear polymer is from 10% to 35% by weight and the amylaceous material is from 65% to 90% by weight.

The $T_1$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September, 1950). The $T_1$ value here used is that determined at 300 kg./cm.$^2$ The amount of hexamethylenetetramine may be from 5% to 20% based on the weight of pigment and is preferably between 10% and 15% by weight of the pigment.

The pigments that may be employed include clays, especially of the kaolin type, calcium carbonate, blanc fixe, talc, titanium dioxide, colored lakes and toners, ochre, carbon black, graphite, aluminum powder or flake, chrome yellow, molybdate orange, toluidine red, copper phthalocyanines, such as the "Monastral" blue and green lakes. The term "mineral" in the claims is intended to cover all such types of pigmentary matter whether of strict mineral character or partly of organic material. From the standpoint of cost, it is desirable to use clay as the predominant proportion of the pigment.

In general, the procedure involves dissolving the amylaceous material separately to provide a suitable colloidal solution thereof, such as one of a concentration of 20% to 30% by weight. This may be done by slurrying the amylaceous material in the predetermined amount of water and heating to 180° F. for 10 minutes in the case of starch itself, lower temperatures and shorter times being generally suitable with other amylaceous materials. The pigment or mixture of pigments is dispersed into water by means of a dispersing agent to produce a suspension or dispersion of the pigment having the desired pigment concentration, such as on the order of 65% to 80%. The dispersion of amylaceous material is then mixed with the pigment slurry or dispersion and, when a linear polymer is to be included as a part of the binder, an aqueous dispersion thereof is added either to the amaylaceous dispersion or to the pigment dispersion before such dispersions are mixed or, if desired, to the dispersion of pigment and amylaceous material after they have been mixed. Aqueous dispersions of other binder materials, such as casein or the like, may be incorporated either before or after the other binder materials are mixed with the pigment dispersion. The hexamethylenetetramine may be dissolved in water and added to the pigment/binder dispersion, or it may be added to the pigment dispersion or to one of the binder dispersions before they are mixed. Generally, the coating compositions should have total solids concentrations between 40% and 70% for most purposes.

The reason for the action of the hexamethylenetetramine in the compositions is not understood. However, it has been found that it is not producing its effect simply by the liberation of formaldehyde since the use of formaldehyde in place of the hexamethylenetetramine has not been found to improve the resistance to pick.

In the following examples, which are illustrative of the invention, the parts given are by weight unless otherwise noted:

Example 1

Eighty parts of fine coating clay (kaolin), 20 parts of titanium dioxide, 0.2 part of sodium hexametaphosphate are mixed in 43 parts of water, and 0.2% (on the weight of clay) of sodium hydroxide was added to adjust the pH to 9. Then 20 parts of starch are mixed with 60 parts of water and heated at 180° F. for 10 minutes. The resulting starch dispersion is mixed with the pigment dispersion. Then 15.4 parts of hexamethylenetetramine are dissolved in 32.8 parts of water and the solution is mixed into the starch/pigment dispersion.

A dry chipboard (0.017 inch thick) is then coated with the composition (which contains 20% of starch on the weight of pigment) by means of a No. 12 wire-wound rod. About 5 to 6 pounds of the coating composition (dry weight) per 1000 sq. ft. of the board is thus applied to one surface. The coated board is dried in an oven by air heated at 185° F. for a period of 45 to 60 seconds. It is then calendered by rolls at room temperature at a pressure of 60 lbs./lineal inch. The coated board has a good, smooth surface highly receptive to ink, completely resistant to pick (that is removal) by inks having a tack corresponding to No. 2, and subject to only a slight pick by a No. 3 ink.

A similar pigmented composition having the same pigment to binder ratio from which the hexamethylenetetramine is omitted shows slight pick even with a No. 2 ink.

Example 2

Eighty parts of fine coating clay (kaolin), 20 parts of titanium dioxide, 0.2 part of sodium hexametaphosphate are mixed in 43 parts of water, and 0.2% (on the weight of clay) of sodium hydroxide was added to adjust the pH to 9. Then 13 parts of starch are mixed in 39 parts of water and heated to 180° F. for 10 minutes. The resulting starch dispersion is mixed with the pigment dispersion. Then 14.6 parts of an aqueous dispersion containing about 7.6 parts water and about 7 parts of a copolymer of 60% by weight of styrene with 40% by weight of butadiene prepared by emulsion copolymerization are added to the starch/pigment dispersion. Then there is added to the resulting dispersion a solution of 10 parts of hexamethylenetetramine in 40.8 parts of water.

The resulting composition is coated on chipboard in the manner described in Example 1. The coated board shows only a negligible pick with a No. 5 ink. When the same composition except for the omission of hexamethylenetetramine (and having the same pigment: binder ratio) is coated in the same manner on the board, the coating shows substantial pick with a No. 5 ink and a slight pick even with a No. 4 ink.

Example 3

The procedure of Example 2 is followed except that the 14.6 parts of aqueous copolymer dispersion is replaced with 14.9 parts of an aqueous dispersion containing about 7.9 parts of water and 7 parts of the potassium salt of a copolymer of about 65% by weight of ethyl acrylate, about 33½% by weight of methyl methacrylate, and about 1½% by weight of methacrylic acid prepared by emulsion copolymerization.

The coated chipboard shows negligible pick with a No. 5 ink. A corresponding coated board prepared with a composition like the above except for the omission of hexamethylenetetramine (at the same binder: pigment ratio) shows pick even with a No. 4 ink.

Example 4

When the procedure of Example 2 is repeated substituting for the starch a corresponding amount of a water-dispersible ethylene oxide-modified starch containing about 3% of oxyethylene units, a similar improvement in resistance to pick is obtained when the hexamethylenetetramine is used as compared to the composition without it.

It is to be understood that changes and variations may be made without departing from the spirit and scope of the invention as defined in the appended claims.

I claim:

1. A mineral-coated paper product comprising a paper sheet carrying on a surface thereof a coating comprising a finely-divided pigmentary material and, for each 100 parts by weight of the pigment, from 8 to 25 parts by weight of a binder comprising an amylaceous material modified by from about 5 to 20 parts by weight of hexamethylenetetramine, the amylaceous material being selected from the group consisting of starch and starch ethers in which the starch is combined with 1% to 5% on its weight of ethylene oxide.

2. A paper product as defined in claim 1 in which the binder comprises at least 50% by weight of amylaceous material.

3. A paper product as defined in claim 1 in which the binder comprises at least 50% by weight of amylaceous material and includes a water-insoluble linear addition polymer having a transition temperature $T_1$ between about −45° C. to about 20° C.

4. A paper product as defined in claim 1 in which the binder comprises starch.

5. A paper product as defined in claim 1 in which the binder comprises at least 50% by weight of starch.

6. A paper product as defined in claim 1 in which the binder comprises 65% to 90% starch and 10% to 35% of a water-insoluble linear addition polymer.

7. A paper product as defined in claim 6 in which the copolymer of butadiene with styrene.

8. A paper product as defined in claim 6 in which the polymer is a polymer of at least one ester of an alcohol having 1 to 12 carbon atoms with at least one acid selected from the group consisting of acrylic, methacrylic, and itaconic acids.

9. A paper product as defined in claim 6 in which the polymer is a copolymer of ethyl acrylate with methyl methacrylate.

10. A paper product as defined in claim 6 in which the polymer is a copolymer of (1) at least one ester of an alcohol having 1 to 12 carbon atoms with at least one acid selected from the group consisting of acrylic, methacrylic, and itaconic acids and (2) from 1% to 5% of an acid selected from the group consisting of acrylic, methacrylic, and itaconic acids.

11. A paper product as defined in claim 6 in which the polymer is a copolymer of ethyl acrylate with methyl methacrylate and 1% to 5% of methacrylic acid.

12. An aqueous coating composition comprising a dispersion in water of a finely divided pigmentary material and, for each 100 parts of pigmentary material, 8 to 25 parts by weight of a binder comprising an amylaceous material and from about 5 to about 20 parts by weight of hexamethylenetetramine, the amylaceous material being selected from the group consisting of starch and starch ethers in which the starch is combined with 1% to 5% on its weight of ethylene oxide.

13. A composition as defined in claim 12 in which the pigmentary material is predominantly clay.

14. A composition as defined in claim 12 in which the total solids concentration of the dispersion is from 40% to 70%.

15. A composition as defined in claim 14 in which the binder comprises at least 50% by weight of amylaceous material and includes a water-insoluble linear addition polymer having a transition temperature $T_1$ between about −45° C. to about 20° C.

16. A composition as defined in claim 14 in which the binder comprises 65% to 90% starch and 10% to 35% of a water-insoluble linear addition polymer.

17. A composition as defined in claim 16 in which the polymer is a polymer of at least one ester of an alcohol having 1 to 12 carbon atoms with at least one acid selected from the group consisting of acrylic, methacrylic, and itaconic acids.

18. A composition as defined in claim 16 in which the polymer is a copolymer of (1) at least one ester of an alcohol having 1 to 12 carbon atoms with at least one acid selected from the group consisting of acrylic, methacrylic, and itaconic acids and (2) from 1% to 5% of an acid selected from the group consisting of acrylic, methacrylic, and itaconic acids.

19. A method of producing mineral-coated paper which comprises coating at least one side of a paper sheet with an aqueous dispersion of 40% to 70% total solids concentration, having a pH of 8.5 to 9.5, said dispersion containing (1) a pigment comprising a predominant proportion of clay, (2) 8% to 25%, on the total weight of pigment, of an amylaceous binder selected from the group consisting of starch and starch ethers in which the starch is combined with 1% to 5% on its weight of ethylene oxide, and (3) 5% to 20%, on the total weight of pigment, of hexamethylenetetramine.

References Cited in the file of this patent

UNITED STATES PATENTS

| | | |
|---|---|---|
| 2,537,114 | Young et al. | Jan. 9, 1951 |
| 2,684,953 | Stilbert et al. | July 27, 1954 |
| 2,685,571 | Stinchfield et al. | Aug. 3, 1954 |